C. B. CULVER.
TREADMILL PLAY CART.
APPLICATION FILED JAN. 27, 1919.
1,350,546.
Patented Aug. 24, 1920.
2 SHEETS—SHEET 2.
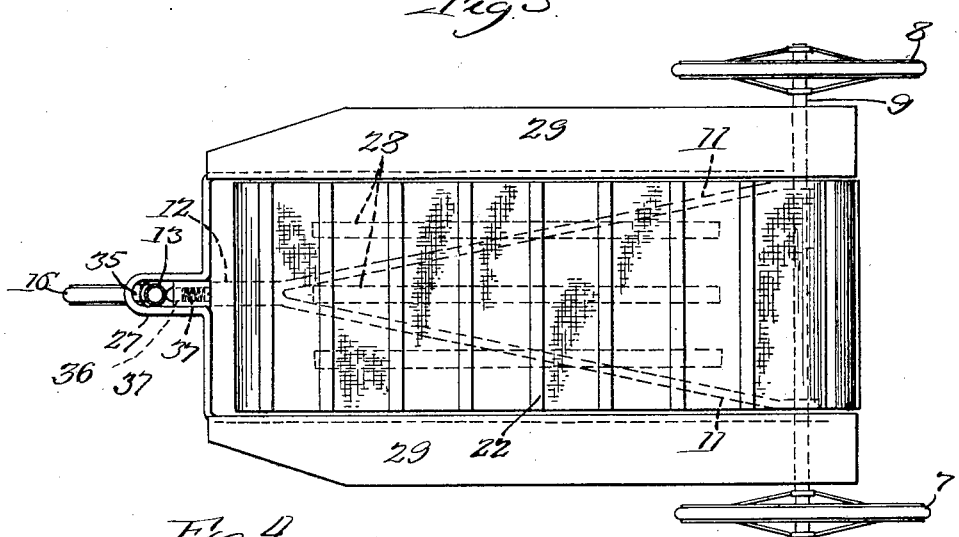
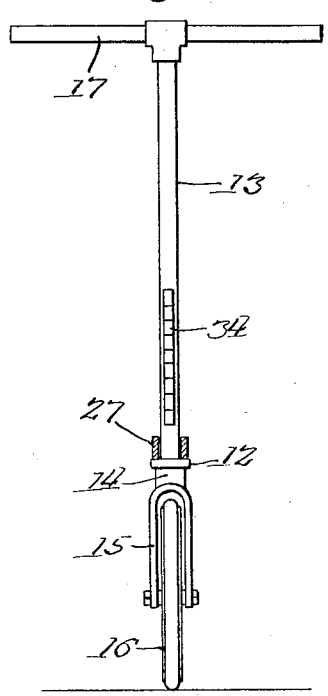
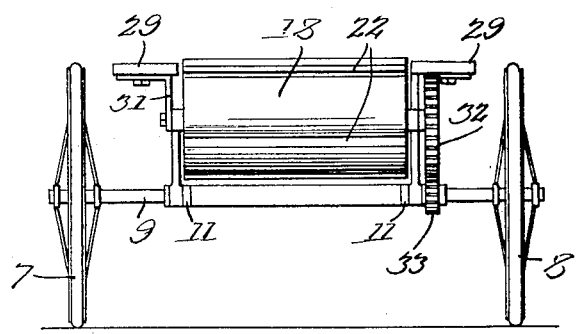
Inventor:
Charles B. Culver
By Ira J. Wilson
Atty.

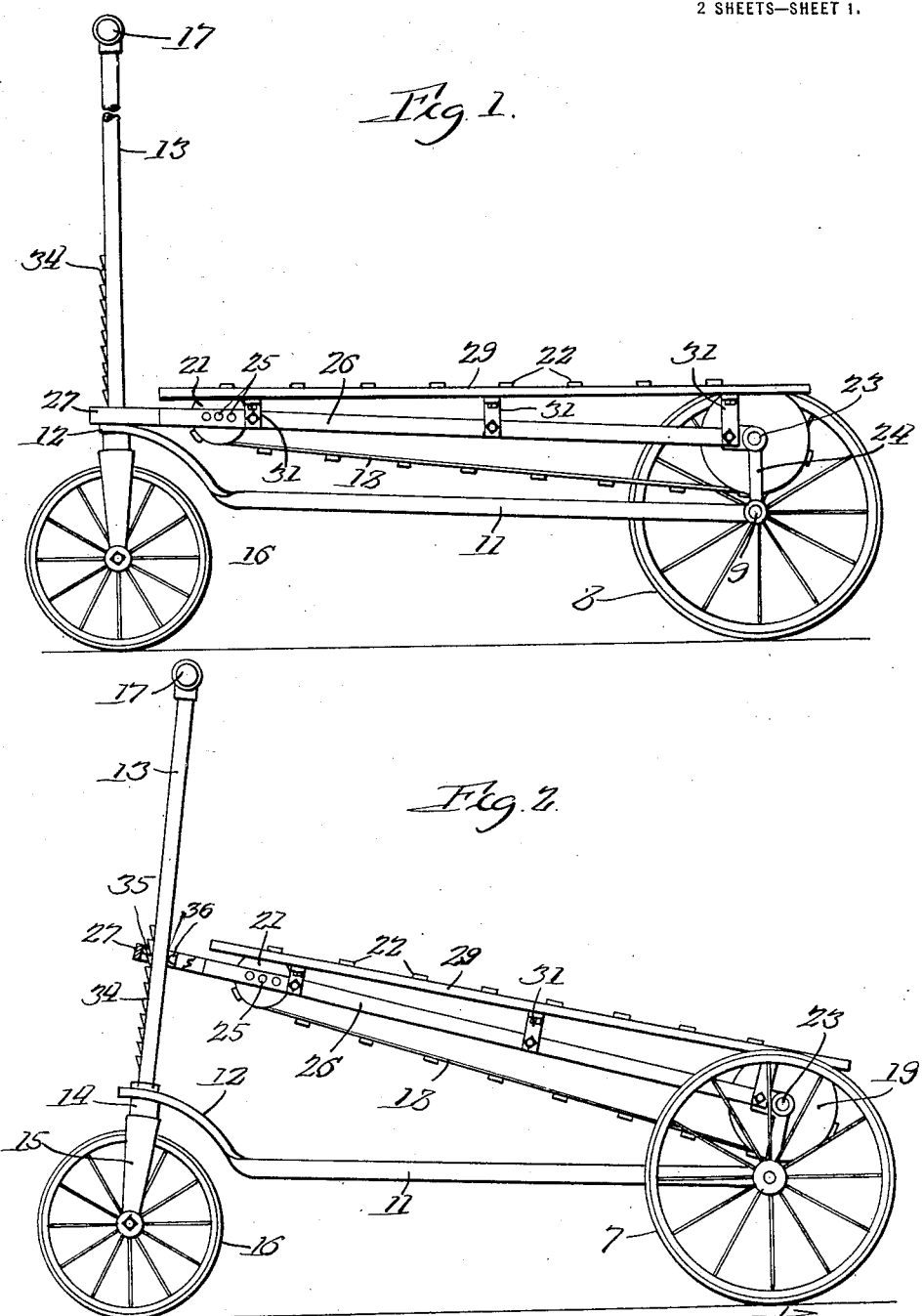

UNITED STATES PATENT OFFICE.

CHARLES B. CULVER, OF CHERRY VALLEY, ILLINOIS.

TREADMILL PLAY-CART.

1,350,546.   Specification of Letters Patent.   Patented Aug. 24, 1920.

Application filed January 27, 1919. Serial No. 273,283.

*To all whom it may concern:*

Be it known that I, CHARLES B. CULVER, a citizen of the United States, residing at Cherry Valley, in the county of Winnebago and State of Illinois, have invented certain new and useful Improvements in Treadmill Play-Carts, of which the following is a specification.

This invention relates in general to velocipedes, and has more particular reference to children's play carts having such mechanical means of propulsion as require bodily exercise for the operation thereof; and the primary object is to provide a child's play cart of the character equipped with a tread mill adapted to be operated in a novel manner for propelling the cart.

Another object of my invention is to provide a play cart of the character mentioned in which the tread mill and steering means are relatively arranged in a particularly advantageous manner permitting the operator to conveniently steer the cart and at the same time operate the tread power for propulsion.

A further object resides in the novel construction whereby the tread mill is adjustable to different inclinations, the purpose of which is to increase or diminish the effort necessary for propelling the cart.

Other objects and attendant advantages will be appreciated as the invention becomes better understood by reference to the following description when considered in connection with the accompanying drawings, in which—

Figure 1 is a side elevation of a play cart embodying my improvements with one of the rear wheels removed, and showing the tread mill in a horizontal position;

Fig. 2, a side elevation showing the tread mill in an inclined position;

Fig. 3, a plan view of the play cart with the steering post in section;

Fig. 4, a front elevation of the steering wheel and post; and

Fig. 5, a rear elevation of the rear wheels and immediate parts supported thereby.

My invention contemplates broadly the embodiment of a tread mill in a play cart in such manner that the cart may be propelled by a child with just sufficient physical effort as to provide healthy bodily exercise, and contemplates also such arrangement of a tread mill in connection with a steering post that a child in propelling the cart stands on the tread mill and steadies himself by grasping the handles of the steering post.

In the preferred form of my improvements, I have employed a three wheeled cart, the construction of which might be considerably varied without departing from the present invention. As shown in the drawings, the rear wheels 7 and 8 support an axle 9 to which at least one of the wheels is secured. Upon this axle is mounted a pair of frame sills 11 which converge forwardly into a single frame member 12. This member 12 embraces an upright steering post 13 and rests upon a collar 14 of a yoke 15 to which the steering post 13 is secured and which in turn straddles the front steering or dirigible wheel 16 and is supported thereby. The upper end of the steering post 13 is equipped with suitable handles 17. It is obvious that a frame is thus provided including rear wheels and a front dirigible wheel adapted to be steered by the handles 17.

A suitable adjustable frame is now provided for carrying an endless tread mill designated generally by reference character 18, in operative relation with the rear wheels and the steering post. This tread mill may be of any suitable construction and at present is illustrated as comprising a flexible endless belt or carrier trained over a rear cylinder 19, a forward cylinder 21 or the equivalent, and equipped on its periphery with a plurality of cleats 22. The rear cylinder 19 is fixed to a shaft 23, supported at its ends in brackets 24, in turn mounted on the axle 9, and the front cylinder 21 is mounted on a shaft 25, in turn mounted at its ends in the side bars 26 of the tread mill frame. These side bars 26, it will be noted are fixed at their rear ends to the brackets 24 and as shown in Fig. 3, are formed from a single flat bar shaped medially to provide a U-shaped arm 27 embracing the steering post 13 and normally resting on the frame part 12 as indicated in Fig. 1. Suitable means may be provided for adjusting the endless tread mill to take up slack, and in the present instance, this is accomplished by forming a plurality of holes in the side bars 26 for adjustment of the front cylinder 21. In order that the upper reach of the endless tread mill shall support the weight of the operator I have arranged a suitable platform or backing beneath this upper reach comprising in this case a plurality of longitudinally disposed slats or bars 28, Fig. 3, suitably supported from the side bars 26. Flanking each side of the upper reach of the tread power and preferably extending co-extensive with the length thereof is a running board or foot rail 29 upon which the operator may stand and which is supported in fixed position by suitable brackets 31 attached to the side bars 26. A suitable driving connection is now established between the shaft 23 and the axle 9 and may be in the form of a gear 32 fixed to the shaft 23 and a pinion 33 fixed to the axle 9, as shown in Fig. 5.

While I have illustrated the tread mill as being trained around a cylinder separate from the axle 9 but in driving connection therewith, it should be understood that my invention also contemplates the training of this tread mill directly about a cylinder concentric with the axle and in suitable driving connection therewith. In other words, my invention is not circumscribed by the particular driving connection herein illustrated between the tread mill and driving wheels. From the foregoing, it will be evident that an operator standing on the tread mill and grasping the handle bars 17 may propel the cart by backward foot pressure on the tread mill in a movement resembling walking, the speed of propulsion being commensurate with the speed of this foot movement.

I have now aimed to provide means for adjusting the front end of the tread mill vertically to vary the inclination of the upper reach thereof for the purpose of increasing or diminishing the physical effort needed for propelling the cart. To this end, I prefer to support the tread mill frame from the steering post, and as explained above, I have arranged the forward end 27 of the tread mill frame to straddle the steering post and be supported thereby. When the tread mill is in its lowermost position as shown in Fig. 1, the frame portion 27 rests on the frame part 12, but the tread mill is free to be swung upwardly at its forward end and be supported by the steering post at different elevations, thus supporting the upper reach of the tread mill at different inclinations. To this end, the post 13 may be provided with a notched or toothed face 34 adapted to be engaged by a toothed projection 35 fixed to the frame part 27. Suitable means is provided for constantly urging the post 13 forwardly to hold the toothed portion 34 in engagement with the part 35 at any adjusted position of the tread mill frame. This means, in the present instance, is shown in Fig. 3 as comprising a plunger 36 suitably held between the sides of the frame part 27 and yieldingly urged against the post 13 by an expansion spring 37.

In use, the operator adjusts the tread mill to the desired inclination by simply raising the forward end of the tread mill frame, which will be automatically locked in position when the frame is released. The operator standing on the upper reach of the tread mill and grasping the handles 17 operates the tread mill by backward pushing movement of the feet, using the steering post as a brace. In effect, the operator pushes forward on the handles which has a tendency to hold the connection between the tread mill frame and steering post. If the operator desires to lower the tread mill frame, he simply draws back on the handles, thereby disengaging the teeth 34 and 35 and allowing the forward end of the frame to fall the desired distance. The operator may step from the tread mill onto the running boards at any time during motion of the cart as is often desired, allowing it to travel under its momentum or to glide or coast down grades.

It is believed that the foregoing conveys a clear understanding of my invention, and while I have illustrated but a single working embodiment thereof, it should be understood that various changes might be made in the construction and arrangement without departing from the spirit and scope of the invention as expressed in the appended claims, in which—

I claim:

1. A play cart of the character described comprising a pair of drive wheels, a front steering wheel, a main frame supported by said wheels and holding them in operative relation, a tread mill drum above the axis of the rear wheels and having a gear connection with the latter, a tread mill idler at the rear of and above the steering wheel, a tread mill trained over said drum and idler so that its upper reach is disposed substantially above the main frame of the cart, and means supporting said drum and idler in their respective positions.

2. A device of the character described comprising a wheeled frame having a rear drive wheel and a front steering wheel, means for steering said wheel, an endless tread mill having a driving connection with said driving wheel, and means for varying the inclination of the tread mill.

3. A play cart of the character described comprising a pair of rear wheels, an axle carried thereby, an endless tread mill supported by and in driving connection with the axle and extending forwardly therefrom, a front steering wheel, an upright steering post therefor, and a connection between the tread mill and said post whereby the forward end of the tread mill may be adjusted to different elevations on the post.

4. A play cart of the character described comprising rear wheels and a front steering wheel, an upright post for turning the steering wheel, and an endless tread mill having driving connection with one of the rear wheels and adjustably supported at its forward end by said post whereby the forward end of the tread power may be adjusted to different elevations for varying the inclination of the tread mill.

5. In a device of the character described, the combination of a pair of rear wheels, an axle therefor, a cylinder or the equivalent supported from and above the axle in parallel relation thereto, gearing between the cylinder and axle, an endless tread mill trained about the cylinder, an idler positioned forward of the axle and about which the tread mill is trained, a dirigible wheel for the forward end of the vehicle adapted to be guided by the operator of the tread mill, and means permitting adjustment of said forward idler vertically with respect to the dirigible wheel.

6. In a play cart of the character described, the combination of a pair of rear wheels, an axle therefor, a cylinder or the equivalent supported from and above the axle in parallel relation thereto, gearing between the cylinder and axle, an endless tread mill trained about the cylinder, an idler positioned forward of the axle and about which the tread mill is trained, means for supporting said forward idler at different elevations whereby to vary the inclination of the tread mill, and a dirigible wheel for the forward end of the cart adapted to be guided by the operator of the tread mill.

7. A play cart for the character described comprising a wheeled frame having a rear driving wheel and a front dirigible wheel, the latter of which is connected with an upright steering post, a tread mill having a driving connection with one of the rear wheels and supported by a frame having a vertically adjustable connection with the steering post.

8. A play cart of the character described comprising a wheeled frame including a rear driving wheel and a front dirigible wheel, the latter of which is connected with an upright steering post, a tread mill having a driving connection with one of the rear wheels and supported by a frame having a vertically adjustable connection with the steering post, and means for varying the inclination of the tread mill by actuation of the steering post.

CHARLES B. CULVER.